March 23, 1937. W. C. LAUGHLIN ET AL 2,074,965
FILTER BED CLEANING DEVICE FOR SEWAGE CLARIFICATION TANKS
Filed Sept. 15, 1933 2 Sheets-Sheet 1

INVENTORS
William C. Laughlin
Abraham B. Asch
BY
their ATTORNEY

March 23, 1937. W. C. LAUGHLIN ET AL 2,074,965
FILTER BED CLEANING DEVICE FOR SEWAGE CLARIFICATION TANKS
Filed Sept. 15, 1933 2 Sheets-Sheet 2

INVENTORS
William C. Laughlin
Abraham B. Asch
By
their ATTORNEY

Patented Mar. 23, 1937

2,074,965

UNITED STATES PATENT OFFICE 2,074,965

FILTER BED CLEANING DEVICE FOR SEWAGE CLARIFICATION TANKS

William C. Laughlin, Kew Gardens, N. Y., and Abraham B. Asch, Jersey City, N. J., assignors to Filtration Equipment Corporation, New York, N. Y., a corporation of Delaware Application September 15, 1933, Serial No. 689,548

8 Claims. (Cl. 210—122)

This invention relates to cleaning devices for filter beds in sewage clarification tanks, and more particularly to cleaning devices of that type which are of more or less recent development in the art and are known as traveling separators which function to separate the dirty water, solids and impurities entrapped in the filter bed from the clarified effluent.

Our present invention embodies improvements in filter bed cleaning devices of the general type disclosed in United States Letters Patents Nos. 1,919,564, 1,919,565, and 1,919,567, all issued on July 25, 1933, to us, and designed particularly for use in connection with sewage clarification tanks. The devices of these patents include means for stirring up the sand to effect the release of the enmeshed matter into a current of liquid guided into a collector chamber whence it is removed by a pump.

As in the said patents, it is the purpose and object of the present invention to clean the filter bed in a sewage clarification tank without interfering with the filtering operations or with the processes of sewage treatment, transpiring within the tank.

One of the objects of the present invention is to obtain a clearer and purer effluent and to prevent the same from becoming befouled by any small streams or currents of dirty liquid which may escape from being gathered in the stream flow to the main collector chamber.

Our improved device is characterized by the fact that it includes in its construction an auxiliary collector chamber so arranged that the dirty liquids and foul matters which are not gathered by the stream moving into the main collector chamber will be gathered in a stream moving into an auxiliary or trailing collector chamber. A separate and independent inlet is provided for the auxiliary collector chamber and the liquid gathered therein is kept separate from the liquid gathered in the main chamber. According to our improvements a separate pump may be used for the auxiliary collector chamber and the liquid discharged therefrom, being less foul than that gathered in the main chamber, may be used in connection with the stirring means as "wash" liquid for the bed.

Another object of the invention is to provide on the traveling cleaner, leveling means in the form of scraping shoes for leveling off the surface of the bed immediately in advance of the cleaning operations so that the bottom portions of the cleaner can come into closer proximity to, or in actual contact with, the surface of the bed. By means of the scraping shoes, the surface of the material of the bed is rendered level and smooth, all alternating ridges and valleys being removed so as to provide for more efficient cleaning and prevent the escape of dirty liquid from the resistance territory to the clear effluent. A further object in this connection is to make provision for so arranging the shoes in a circular bed, that the surface thereof will be leveled in a centripetal direction to offset or compensate for the natural tendency of the circularly traveling cleaner to slowly accumulate the filtering medium in a centrifugal direction.

With the above and other objects in view, the invention consists in the improved filter bed cleaning device and in the form, construction, and manner of arrangement of the several parts as will be hereinafter more fully described and illustrated as an example in the accompanying drawings.

In the drawings, wherein similar reference characters designate corresponding parts throughout the several views.

Figure 1:
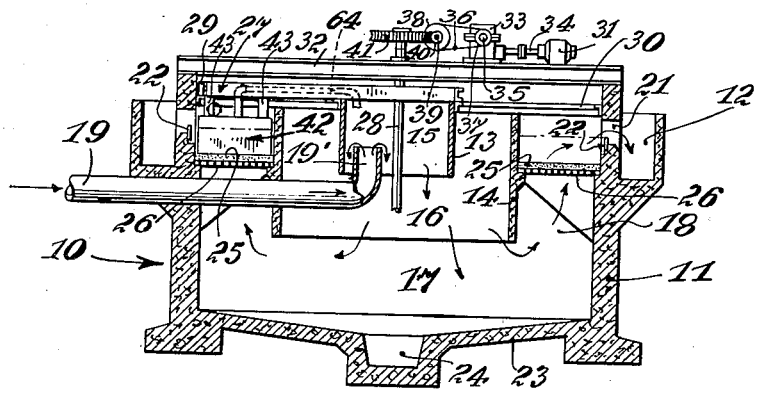
Figure 1 represents a vertical sectional view through a circular clarification tank furnished with a filter bed and equipped with a filter bed cleaning apparatus constructed and arranged in accordance with our invention.

Referring to the accompanying drawings, and first to Figure 1, 10 denotes in general a sewage clarification tank of circular form and which may be constructed from concrete or any material suitable for the purpose. Constructed with the circumferential wall 11 of this tank, intermediate the height thereof, is an exterior launder 12 the purpose of which is to receive and carry away clear effluent. Internally, this tank is divided by the concentric baffle walls 13 and 14 into the chambers 15, 16, 17, and an outer circular canal or chamber 18 between the baffle wall 14 and circumferential wall 11. The raw sewage which is to be treated is introduced into the central chamber 15 through a supply pipe 19 which passes through the walls 11 and 14, the inner end 19' of this pipe being upturned to deliver upwardly into the chamber 15 which serves as a water-head. The introduced sewage passes downwardly through the open end of the chamber 15 into the chamber 16 and thence downwardly into the main chamber 17 from which due to the water-head pressure, liquid will rise upwardly through the outer circular chamber 18 to spill through the openings 21 into the launder. Vertically adjustable gates or weirs 22 associated with the openings 21 control the flow of liquid from the chamber 18 into the launder, and it will, of course, be recognized that in order to obtain a continuous flow through the clarification tank, the level of the liquid in the water-head 15 must be maintained at a point higher than the top edges of the weirs 22. By reason of the water-head, a siphoning action is provided for moving the liquid upwardly through the outer circular chamber or canal 18 for discharge over the weirs 22. The sewage solids, having a higher specific gravity than the water, settle downwardly to the bottom 23 of the tank, while the lighter water, solids and impurities rise in the outer circular canal 18 towards the discharge outlets 21. The bottom 23 slopes downwardly and inwardly to a central sump 24, and the relatively heavy matter or sludge which settles upon the sloping bottom gradually moves into the sump from where it is drawn off by a sludge pipe (not shown) or other suitable discharging medium.

In the canal 18 at a suitable distance below the discharge outlets 21 is provided a filter bed 25 which may consist either of sand or of magnetite ore supported upon a suitable screen 26. The water and impurities rising in the canal 18 by the siphoning action encounter the filter bed where the filtering out of the impurities takes place, and the clear water effluent resulting from the filtering operation rises upwardly for its discharge through the outlets 21.

The apparatus for cleaning the filter bed includes a traveling carriage which is designated in general by the numeral 27 and which may consist of any suitable framework capable of carrying the various parts which make up the complete operative apparatus for cleaning the bed. This carriage may be supported at or near its inner end on a vertical shaft 28 and at its outer end by a suitable wheel 29 which turns on a track rail 30 provided on the inner face of the circumferential wall 11. This arrangement is such that as the shaft 28 is rotated, the carriage will turn with it through the full circle of the tank so that the filtering medium can be repeatedly cleaned throughout the length of the bed. The carriage is furnished with its own power means, and such means preferably consists of an electric motor 31 which is mounted upon a framework 32, and, in association with the motor, a reduction gear box 33 whereby from the motor shaft 34, to operate the driving shaft 35 at reduced speed. A driving belt 36 connects a pulley 37 on the shaft 35 with a pulley 38 on a shaft 39. Power from the shaft 39 is transmitted to the vertical shaft 28 through the gearing 40 and 41. The cleaning device or apparatus indicated in general by the numeral 42 is suspended from the carriage 27 by means of suitable beams 43.

The cleaning apparatus 42 includes a longitudinally curved tank structure of a size to fit, transversely of the bed, between the baffle wall 14 and the circumferential wall 11, the fit in this regard being such that while the opposite sides 44 and 45 of the cleaner come in close adjacency to said respective walls 14 and 11, yet they do not actually contact therewith, since actual contact would produce frictional resistance to the movement of the cleaner. By means of suitable cross walls 46, 47 and 48, together with the bottom walls 49 and 50, all of which connect the side walls 44 and 45, the cleaner is divided into two liquid-tight compartments 51 and 52, of which the compartment 51 constitutes the main collector chamber while the compartment 52 located at the rear thereof, constitutes an auxiliary collector chamber. The bottom walls 49 and 50 of these chambers are in close proximity to, or in substantial contact with, the top surface of the filter bed 25. These bottoms to the extent of the combined areas thereof define a definite territory or area of resistance for the agitation upwardly of the filter bed medium under the pressure and velocity of the liquid rising therethrough.

Figure 4:
Fig. 4 is a fragmentary top plan view, showing the arrangement of the stirring pipes.
Figure 5:
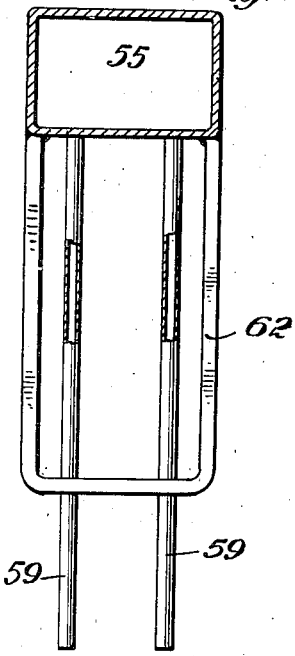
Fig. 5 is a cross section taken on the line 5—5 of Fig. 4.
Figure 6:
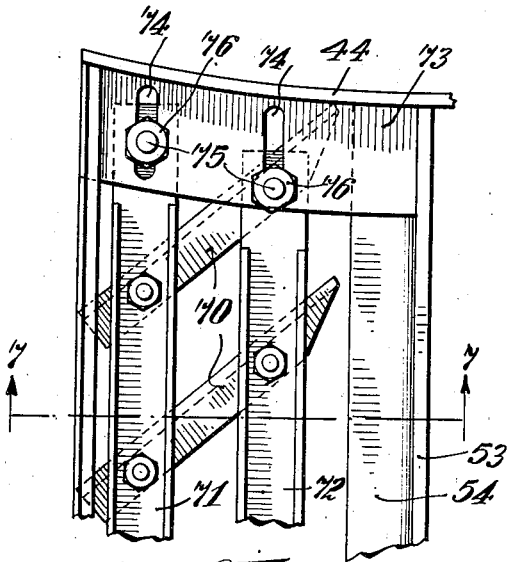
Fig. 6 is a fragmentary top plan view, showing the arrangement of the scraping shoes.
Figure 7:
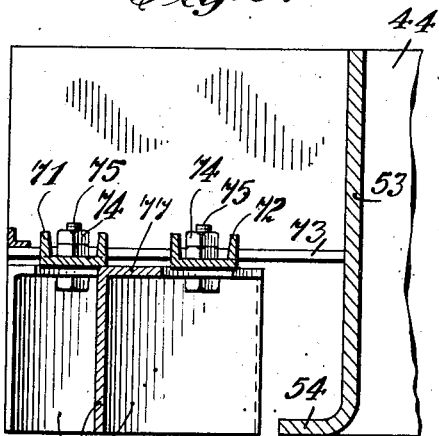
Fig. 7 is a cross section, taken on the line 7—7 of Fig. 6.

In the present exemplification, there is provided between the side walls 44 and 45 at a spaced distance forwardly of the wall 46 and parallel therewith, a wall 53 the lower end 54 of which is curved forwardly a short distance to lie substantially in the plane of the bottoms 49 and 50. At the upper part of the structure, between the walls 53 and 46 as well as between the sides 44 and 45 there is provided a liquid-tight compartment 55 below the bottom wall 55' of which there exists between the walls 53 and 46 an inlet passage 56 in open communication at its bottom end with the filter bed. Liquid rising from the bed under the pressural tide moves upwardly through the passage 56 and is deflected by the bottom wall 55' through an opening 57 to fall into the collector chamber 51. A weir 58 adjustably associated with the wall 46 is provided to control the flow of water from the passage 56 into the interior of the collector chamber; and in this connection it will be noted that the opening 57 is located at a level below the liquid level maintained in the water-head 15. It will be apparent that by reason of the elevation of the water-head, any adjustment of the weir vertically will influence the pressure and velocity of the liquid upwardly through the filter bed for the territory occupied by the cleaner. The weir, therefore, may be adjusted in that precise position which will cause the sand between the screen 26 at the bottom of the bed and the bottom of the cleaner at the top of the bed, to be churned and agitated by the pressure and velocity of the water moving under siphoning action to the opening 57. Means are provided for raking through the material of the bed during the travel of the cleaner whereby to stir up the material of the bed and release the dirt and impurities enmeshed therein, and this means may consist of pipe elements 59 located in the passage 56. These pipes are secured at their upper ends to the bottom 55' so as to be in direct communication with the compartment 55 and they extend downwardly therefrom and into the material of the sand bed. Upon the movement of the cleaner along the top of the bed, the pipes serve as rakes for stirring up and agitating the same to effect thereby the release of the dirty water and impurities which are thereupon carried up by the stream through the passage 56 and through the opening 57 over the top edge of the weir 58 and into the collector chamber. In the present instance, the pipes 56 are stationary; but they, if desired, may be mounted for movement on eccentric or on rocker arms so that the pipes can be given an up and down or even a sidewise movement as the cleaner travels along the bed. The compartment 55 is supplied with liquid which passes downwardly through the pipes 59 for discharge within the material of the bed whereby, simultaneously with the raking action, to subject the material of the bed to a "washing" operation, effected by the jets of liquid issuing from the lower ends of the pipes. The pipes 59 are arranged in a row or rows transversely of the cleaner so that as the latter progresses the material of the bed will be stirred up and thoroughly washed throughout its width. In the present embodiment, we show two transverse rows of pipes arranged in staggered relation (Fig. 4) and braced by suitable stirrup-like members 62 which are secured to and depend from the bottom wall 55'. In the present instance, one stirrup-like member 62 is provided to brace a pipe member in each row, and, for this purpose, is inclined at an angle with respect to the walls 53 and 46.

For removing the dirty water and impurities collected in the chamber 51, we mount therein a pump 63 for which there is provided a discharge line 64 which, in the present instance, extends to the water-head 15 so as to discharge into the latter. For the auxiliary collector chamber 52 there is provided in open communication with the filter bed an inlet passage 65 between the wall 47 and an upwardly and forwardly inclined portion 66 provided for the purpose on the bottom 50. Adjustably associated with the wall portion 66 is a weir 67 over which the liquid which rises upwardly through the passage 65 must flow in order to fall into the chamber 52. For the removal of liquid from the chamber 52, there is provided a pump 68 having a discharge line 69 which extends to the compartment 55 whereby to supply the latter with liquid for washing the sand. Outside the territory occupied by the cleaner, the water rising from the sand bed where the sand has not been agitated or churned under resistance, is clean and rises under siphoning action to the discharge outlets 21. The raking pipes 56 together with the jets of water issuing therefrom thoroughly clean the material of the bed and practically all of the dirty water and impurities resulting from the cleaning operation are collected in the main collector chamber 51. However, owing to the travel of the cleaner, and to furrows or paths which may be produced under the bottom 49 during the raking and churning actions, small streams or currents of dirty water are likely from time to time to find their way rearwardly below the bottom 49, and such streams are caught up in the pressural flow moving upwardly through the passage 65 for deposit in the auxiliary collector chamber 52. Due, therefore, to the provision of the collector chamber 52 substantially no dirty water resulting from the cleaning operation finds its way into the clear effluent rising from the sand bed outside of the territory occupied by the cleaner. In this connection, it may also be stated that the cleaner travels very slowly over the bed and the material of the bed which has been subjected to the raking and washing operations has an opportunity to become quiescent before the bottom 50 moves over it. Owing to the fact that water which is collected in the auxiliary chamber 52 is not very dirty, it is entirely suitable for use as liquid means whereby to effect the washing operation.

Figure 2:
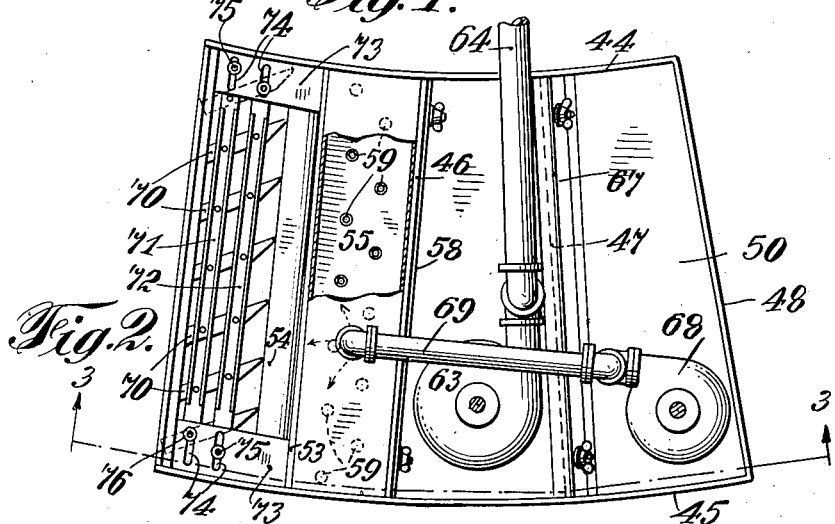
Fig. 2 is a top plan view of the cleaning apparatus.

Mechanical means are provided whereby to level and smooth the surface of the bed prior to the cleaning operations. Owing to the agitation of the material of the bed normally effected by the pressural tide moving upwardly through the outer canal 18 toward the outlets 21, the material of the bed at the surface thereof may more or less be shaped in the form of alternating ridges and valleys. Moreover, as the cleaner moves in a circular path, it normally has a tendency to move the sand more or less in a centrifugal direction, so that in the course of time the bed may become somewhat deeper adjacent the circumferential wall 11 than at the baffle wall 14. To overcome these objections, we provide in advance of the front wall 53 a row of scraping shoes 70 which are inclined at an angle, with their front ends pointed in the general direction of the circumferential wall 11 while their rear ends point in the general direction of the baffle wall 14. These shoes are thus arranged in spaced relation as illustrated in Fig. 2 so as to smooth and level the surface of the bed in a direction toward the baffle wall 14, thereby not only removing any fixed ridges but also serving to keep the bed at a uniform thickness between the walls 14 and 11. The shoes are bolted to a pair of spaced parallel transversely extending bars 71 and 72 the opposite ends of which are adjustably secured to horizontal plates 73 attached to and projecting inwardly from the forwardly projecting ends of the cleaner sides 44 and 45. In order to provide for the adjustment of the bars 71 and 72 longitudinally with respect to one another so as to give the scraping shoes that inclination which will best keep the bed at a uniform thickness, the plates 73 are provided with elongated slots 74 and said bars are secured to said plates by means of bolt members 75 which pass through said elongated slots. By loosening the tightening nuts 76, the bolts may be slid along the slots for adjusting the bars longitudinally as may be necessary to establish the shoes at the required oblique inclinations, whereupon the nuts may be again tightened to hold the parts in their adjusted positions. The bars 71 and 72 may consist of channel-shaped members between their opposite flat ends where they have flatwise engagement with the horizontal end plates 73, and the shoes may consist of angle members the horizontal tops 77 of which fit flatwise against the flat undersides of the bars.

Figure 3:
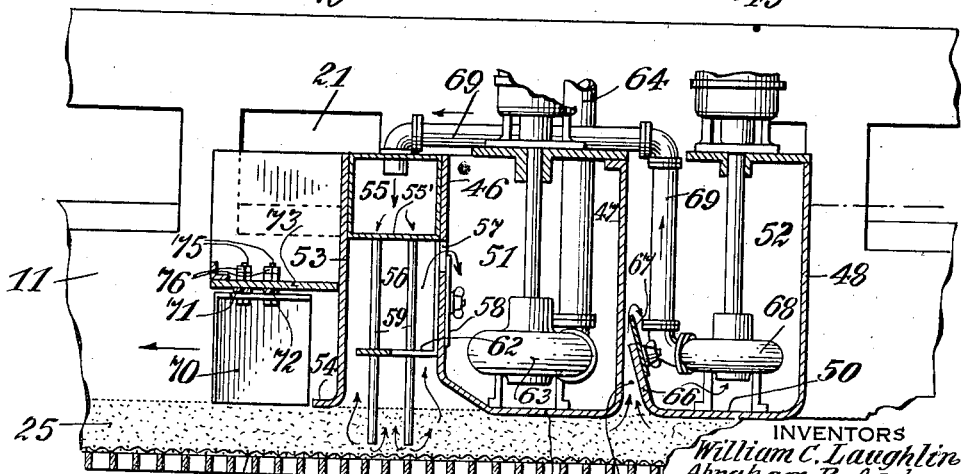
Fig. 3 represents a detailed sectional view, taken on the line 3—3 of Fig. 2 and looking in the direction of the arrows associated with said figure.
Figure 8:
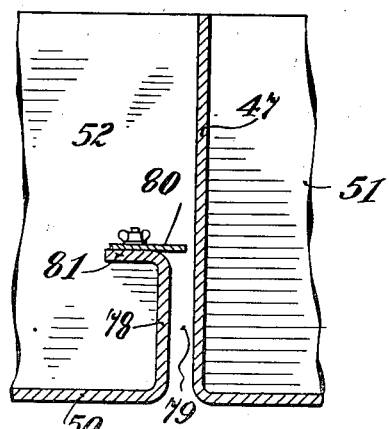
Fig. 8 is a sectional detail, showing a modification in the arrangement of the weir for the auxiliary collector chamber.

In Fig. 8, we show a modification in the arrangement of the inlet passage and weir for the auxiliary collector chamber 52. In this instance, the portion 78 of the bottom wall 50, instead of being inclined, as shown in Fig. 3, is made parallel with the rear wall 47 of the main collector chamber 51, thereby providing a uniformly straight upwardly extending passage 79 to the auxiliary chamber 52. In this instance, also, the weir 80 is adjustably mounted upon a horizontally and inwardly directed portion 81 of the wall 78 so as to control the flow of liquid from the passage 79 into the auxiliary collector chamber 52.

The carriage, carrying the cleaner, continuously moves at a slow rate over the circular bed so as to intervally clean all portions of the material of the bed. The object is to clean all segments of the bed so frequently that there will be no opportunity for the sand to become very dirty. Manifestly, the cleaner the bed is kept, the cleaner the effluent will be. Owing to the provision of the waterhead which introduces a flow of the liquid into each of the collector chambers and as well through the higher discharge outlets 21, and the fact that the walls of each collector tank shut out the clear water effluent while defining a territory of resistance or agitation wherein the dirty water and impurities within the sand bed are released for movement with the stream into the dirty water collector chambers, there results a constant separation of the impurities from the bed so that in practice the latter is kept practically free of solids and impurities. By returning the separated dirty water and impurities collected in the main chamber 51, back to the water-head, these are put into re-circulation for re-treatment within the clarification tank.

It will be evident that the construction herein before set forth is capable of a considerable range of change and modification without in any manner departing from the spirit of our invention and we accordingly do not wish to be understood as limiting ourselves to the specific details of construction hereinbefore set forth except as hereinafter claimed.

We claim:—

1. In a filter bed system including a filter bed, a cleaning device supportable and movable over the bed, having a plurality of liquid-receiving receptacles whose bottoms lie in juxtaposition to the surface of the bed to create a cleaning territory thereover, agitating means on the first receptacle only for agitating the sand in said cleaning zone, individual passageways for the receptacles discharging thereinto at points above their bottoms and extending upwardly from the exteriors of the bottoms so as to guide liquid rising from the bed into the receptacles, said receptacles with their passageways being closely located one behind the other in respect of the direction of the movement of the device and effective respectively to collect liquid in such order, the front wall of the trailing receptacle being closely adjacent the rear wall of the preceding receptacle, thereby defining a narrow passageway between the receptacles.

2. In a filter bed system including a filter bed, a cleaning device supportable and movable over the bed, having a plurality of liquid-receiving receptacles whose bottoms lie in juxtaposition to the surface of the bed to create a cleaning territory thereover, individual passageways for the receptacles discharging thereinto at points above their bottoms and extending upwardly from the exteriors of the bottoms so as to guide foul liquid rising from the bed into the receptacles, said receptacles with their passageways being located one behind the other in respect of the direction of the movement of the device and effective respectively to collect the foul liquid in such order, means on the device for agitating and washing the material of the bed below the passageway of the lead receptacle, and means for conveying liquid collected in the trailer receptacle to said first means to provide wash liquid therefor.

3. In an upflow filter bed system including a cleaning device supportable and movable over the bed, having a plurality of liquid-receiving receptacles whose bottoms lie in juxtaposition to the surface of the bed to create a cleaning territory thereover, individual passageways for the receptacles discharging thereinto at points above their bottoms but below the liquid level and extending upwardly from the exteriors of the bottoms so as to guide foul liquid rising from the bed into the receptacles, said receptacles with their passageways being located one behind the other in respect of the direction of the movement of the device and effective respectively to collect the foul liquid in such order, means carried by the device for agitating and washing the material of the bed below the passageway of the lead receptacle, means for conveying liquid collected in the trailer receptacle to said first means to provide wash liquid therefor, and means for conveying liquid collected in the lead receptacle to the inlet side of said filter bed.

4. The combination with a clarification basin having a circular filter bed therein, of a movable carriage supported on the wall of the basin to move over the bed, a cleaning device supported by the carriage for cleaning the bed, and scraping means mounted diagonally on and in front of the cleaning device with the outer part thereof in advance of the inner part for acting on and leveling the surface of the bed.

5. Means for cleaning a bed of filtering material, the same comprising means for maintaining a pressural movement of liquid upwardly through and to a level above the material, a movable device adapted to define over the material a resistance area to the upward movement of the liquid and having lead and trailer chambers for receiving liquid rising from such area under upward pressural movement, pipe elements carried by the device for raking the material and jetting liquid thereinto whereby to release the dirt for passage with the rising liquid into said chambers, said elements being effective in the resistance area below the lead chamber, a supply tank for the pipes, and means for pumping liquid from the trailer chamber into said supply tank.

6. Means for cleaning a circular bed of filtering material, the same comprising means for maintaining a pressural movement of liquid upwardly through and to a level above the material, a movable device including a chamber and an inlet thereto, said device being adapted to define over the material adjacent the inlet a resistance area to the upward movement of the liquid, said inlet being shaped to direct into the chamber the liquid rising under pressural movement from said area, and mechanical scraping means mounted diagonally on and in front of the device, the outer part of the scraping means being in advance of the inner part, said scraping means acting on the circular bed to level the surface of the same in advance of the resistance area which is created by the device.

7. In a circular filter bed system, a cleaner adapted to be moved parallel with the surface of the circular filter bed and composed of lead and trailer tanks for collecting liquid, separate passageways for the tanks extending upwardly from the bottoms thereof for directing liquid rising upwardly from the bed into the interiors of the tanks, a weir associated with each passageway and over which rising liquid will flow to fall into the interior of the respective tanks, and scraping means carried diagonally by and in front of the cleaner, the outer part of the scraping means being in advance of the inner part, said scraping means when in operation acting on and leveling the circular bed in a direction to keep the same substantially of uniform thickness.

8. In a filter bed system, a cleaner adapted to be moved parallel with the surface of the filter bed and composed of lead and trailer tanks for collecting liquid, separate passageways for the tanks extending upwardly from the bottoms thereof for directing liquid rising upwardly from the bed into the interiors of the tanks, a weir adjustably associated with each passageway over which rising liquid will flow to fall into the interior of the respective tanks, means carried by the tank for raking and washing the material of the bed below the passageway for the lead collector chamber, and means comprising diagonally arranged shoes with spaces between them for acting on and leveling the bed prior to the raking and washing operation.

WILLIAM C. LAUGHLIN.
ABRAHAM B. ASCH.